United States Patent
Lien

(10) Patent No.: US 8,665,366 B2
(45) Date of Patent: Mar. 4, 2014

(54) TV WALL SYSTEM CAPABLE OF DISPLAYING IMAGES ACCORDING TO A POSITIONING SIGNAL

(75) Inventor: Cheng-Nan Lien, Taoyuan County (TW)

(73) Assignee: Qisda Corporation, Taoyuan County (TW)

( * ) Notice: Subject to any disclaimer, the term of this patent is extended or adjusted under 35 U.S.C. 154(b) by 0 days.

(21) Appl. No.: 13/480,437

(22) Filed: May 24, 2012

(65) Prior Publication Data

US 2012/0300121 A1 Nov. 29, 2012

(30) Foreign Application Priority Data

May 27, 2011 (TW) .............................. 100118620 A

(51) Int. Cl.
*H04N 9/12* (2006.01)
*G09G 5/00* (2006.01)

(52) U.S. Cl.
USPC .............................. 348/383; 345/1.1; 345/1.3

(58) Field of Classification Search
USPC ..................................... 348/383; 345/1.1, 1.3
See application file for complete search history.

(56) References Cited

U.S. PATENT DOCUMENTS

| | | | | |
|---|---|---|---|---|
| 6,583,771 | B1 * | 6/2003 | Furuhashi et al. | 345/1.1 |
| 6,611,241 | B1 * | 8/2003 | Firester et al. | 345/1.3 |
| 7,079,157 | B2 * | 7/2006 | Deering | 345/613 |
| 7,215,362 | B2 * | 5/2007 | Klose | 348/189 |
| 7,242,370 | B2 * | 7/2007 | Ouchi et al. | 345/1.3 |
| 7,266,240 | B2 * | 9/2007 | Matsuda | 382/167 |
| 7,489,337 | B2 * | 2/2009 | Houmeau et al. | 348/182 |
| 7,859,542 | B1 * | 12/2010 | Williams et al. | 345/545 |
| 7,940,329 | B2 * | 5/2011 | Houmeau et al. | 348/383 |
| 7,948,450 | B2 * | 5/2011 | Kay et al. | 345/1.3 |

FOREIGN PATENT DOCUMENTS

CN 201556370 U 8/2010

* cited by examiner

*Primary Examiner* — Brian Yenke

(57) ABSTRACT

A TV wall system includes a video source and at least a row of display devices. The video source is used for providing a video signal. The at least one row of display devices is coupled to the video source. The at least one row of display devices includes a plurality of display devices coupled to each other in a cascaded manner. Each of the display devices includes a positioning module, a sensing unit, and a display control unit. The positioning module is used for generating a positioning signal. The sensing unit is coupled to the positioning module for sensing the positioning signal generated by the positioning module. The display control unit is used for controlling the display device to display images according to the video signal and the positioning signal sensed by the sensing unit.

2 Claims, 6 Drawing Sheets

TV WALL SYSTEM CAPABLE OF DISPLAYING IMAGES ACCORDING TO A POSITIONING SIGNAL

BACKGROUND OF THE INVENTION

1. Field of the Invention

The present invention relates to a TV wall system, and more particularly, to a TV wall system capable of displaying images according to a positioning signal.

2. Description of the Prior Art

Please refer to FIG. 1. FIG. 1 is a diagram showing a television (TV) wall system 100 of the prior art. The TV wall system 100 comprises a video source 110 and a plurality of display devices 120. The video source 110 is coupled to each display device 120 for providing a video signal. The plurality of display devices 120 are arranged in a matrix form. Each display device 120 comprises a display control unit 122 for controlling the display device 120 to display images. The display control unit 122 is for controlling the display device 120 to display a divided image according to the video signal and relative position information of the display device 120.

In order to set each display device 120 of the TV wall system 100 to display the right divided image, a user needs to manually input the relative position information of the display device 120 into each display control unit 122 one-by-one via a setting interface of the display device 120 (such as an on screen display, OSD). However, it is easy to make mistakes when manually inputting the relative position information. When the relative position information is inputted incorrectly, the display device 120 can not display the right divided image in order to form a complete image with other divided images displayed by adjacent display devices 120. The TV wall system 100 of the prior art can not automatically detect the relative position information of the display device 120, such that setting of the TV wall system 100 is more complex and prone to error.

SUMMARY OF THE INVENTION

The present invention provides a TV wall system capable of displaying images according to a positioning signal. The TV wall system includes a video source and at least a row of display devices. The video source is used for providing a video signal. The at least one row of display devices is coupled to the video source. The at least one row of display devices comprises a plurality of display devices coupled to each other in a cascaded manner. Each of the display devices includes a positioning module, a sensing unit, and a display control unit. The positioning module is used for generating a positioning signal. The sensing unit is coupled to the positioning module for sensing the positioning signal generated by the positioning module. The display control unit is used for controlling the display device to display images according to the video signal and the positioning signal sensed by the sensing unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
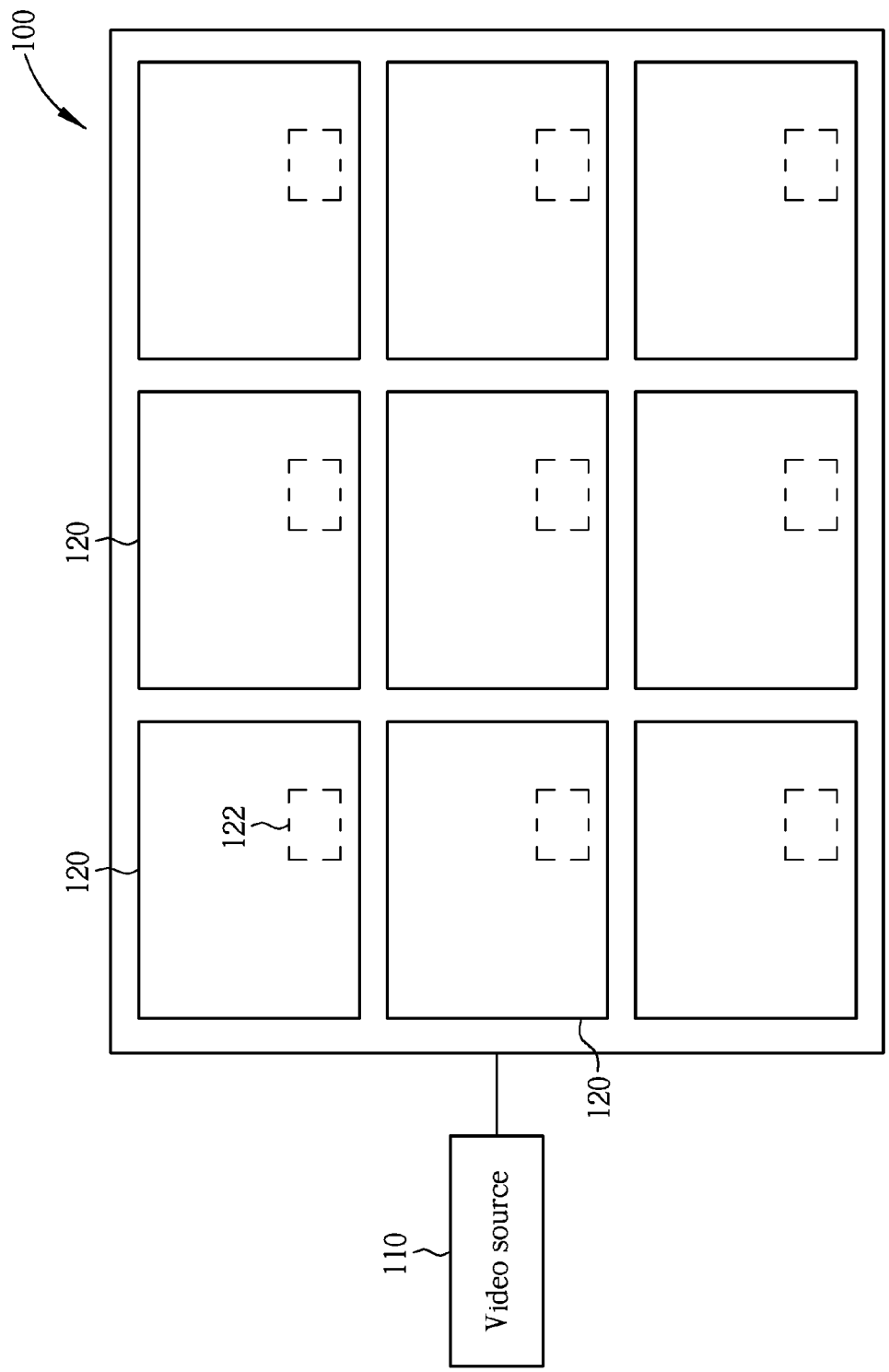
FIG. 1 is a diagram showing a TV wall system of the prior art.
Figure 2:
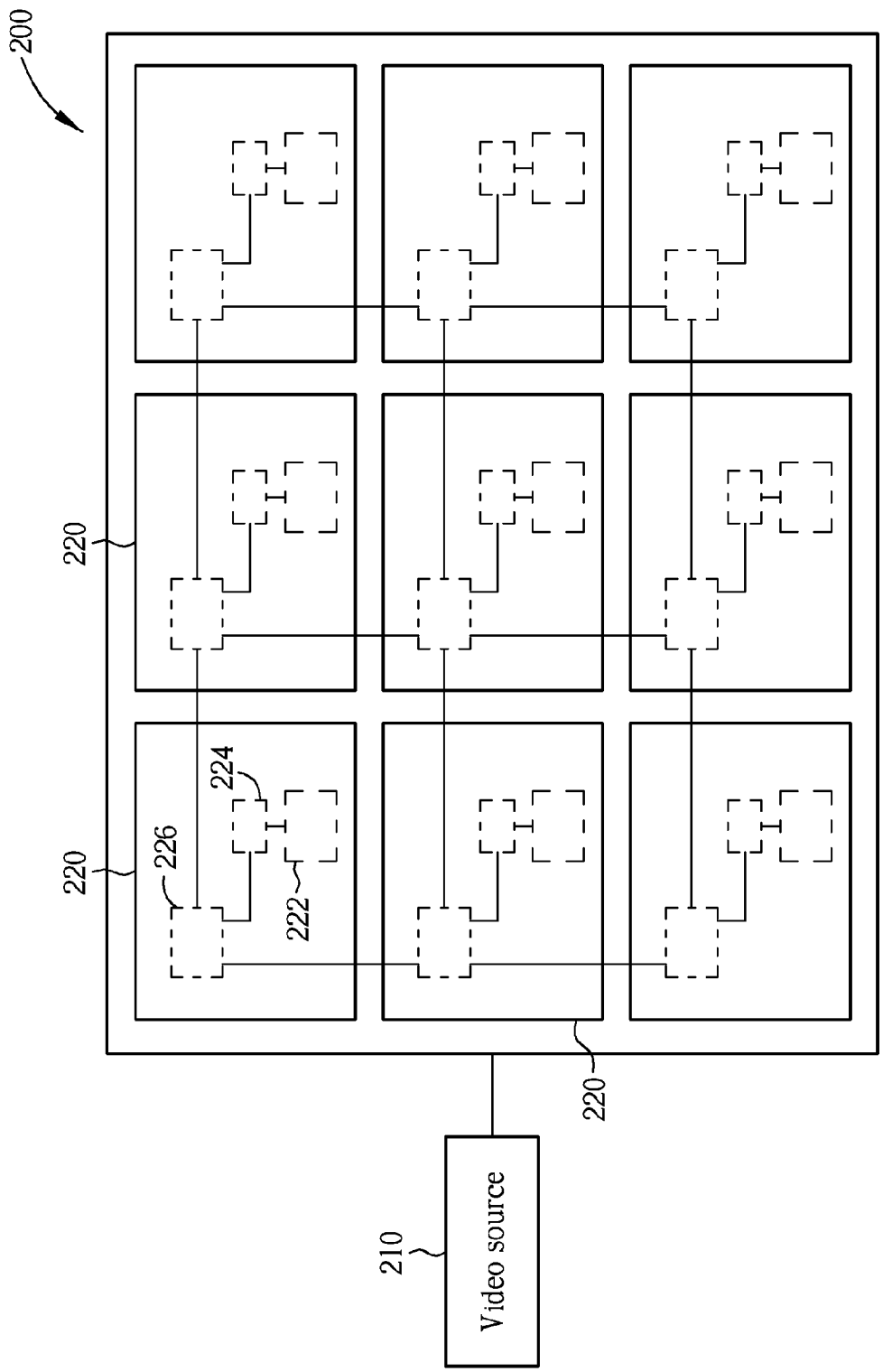
FIG. 2 is a diagram showing a TV wall system of the present invention.

Please refer to FIG. 2. FIG. 2 is a diagram showing a TV wall system 200 of the present invention. The TV wall system 200 of the present invention comprises a video source 210 and a plurality of display devices 220. The video source 210 is coupled to each display device 220 for providing a video signal. The plurality of display devices 220 comprises at least one row of display devices arranged in a matrix form. The display devices 220 is coupled to an adjacent display device 220 in a same row in series, and is also coupled to an adjacent display device 220 in a same column in series. Each display device 220 comprises a positioning module 226, a sensing unit 224, and a display control unit 222. The positioning module 226 is for generating a positioning signal. The sensing unit 224 is coupled to the positioning module 226 for sensing the positioning signal generated by the positioning module 226. The display control unit 222 is coupled to the sensing unit 224 for controlling the display device 220 to display a divided image according to the video signal and the positioning signal sensed by the sensing unit 224.

Figure 3:
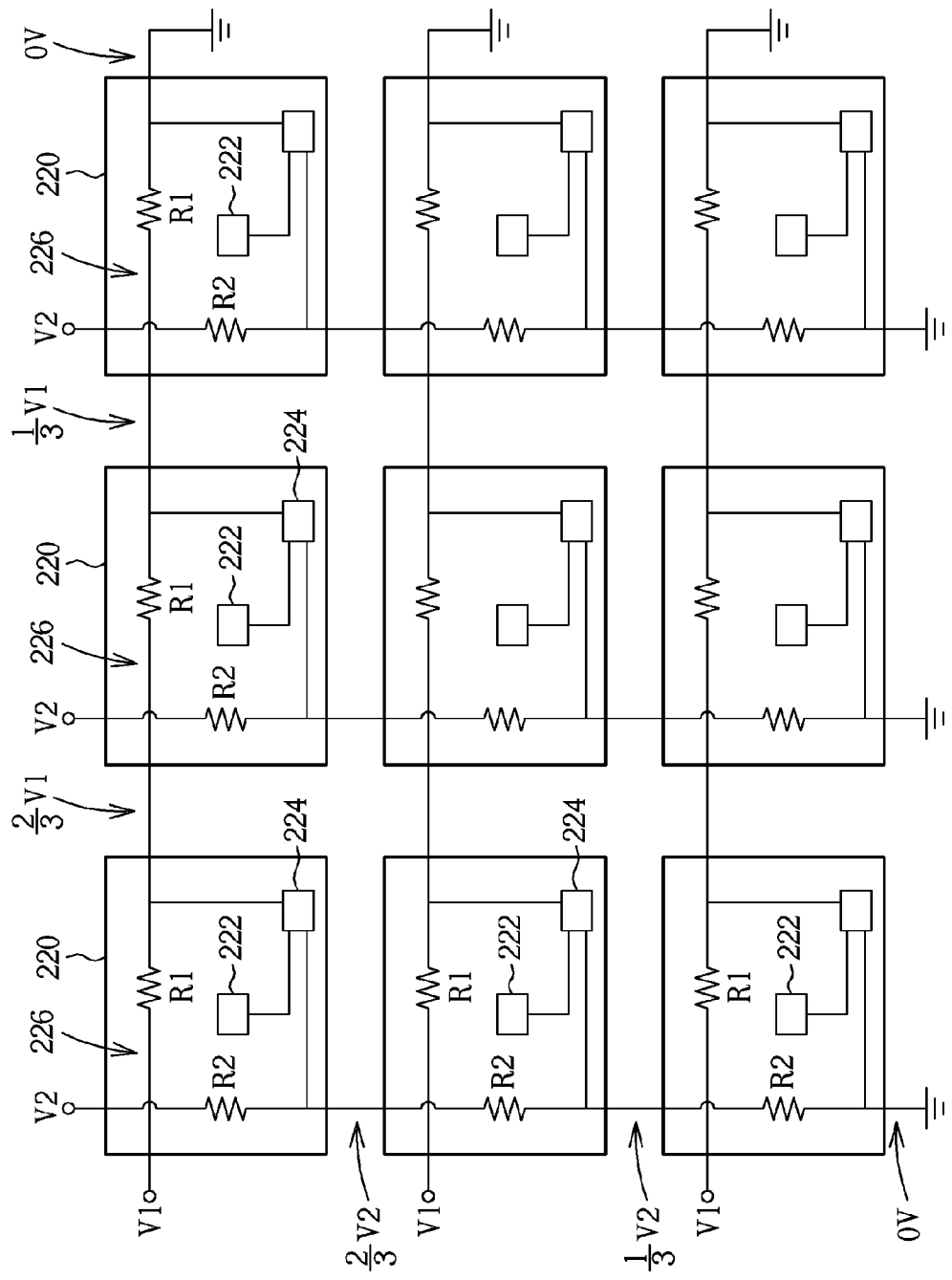
FIG. 3 is a diagram showing a first embodiment of display devices of the present invention.

Please refer to FIG. 3 and FIG. 2 as well. FIG. 3 is a diagram showing a first embodiment of the display devices 220 of the present invention. As shown in FIG. 3, the positioning module 226 comprises a first resistor R1 and a second resistor R2. The first resistor R1 is coupled to another first resistor R1 of the adjacent positioning module in the same row in series for generating a first component voltage according to a first direct current (DC) voltage source V1. The second resistor R2 is coupled to another first resistor R2 of the adjacent positioning module in the same column in series for generating a second component voltage according to a second DC voltage source V2. The sensing unit 224 is for sensing the first component voltage and the second component voltage generated by the positioning module 226. Since a voltage difference is formed at two ends of the resistor, the series-coupled first resistor R1 and second resistor R2 respectively generate the corresponding first component voltage and the corresponding second component voltage (that is, the positioning signals) according to the relative positions of the first resistor R1 and the second resistor R2. The display control unit 222 of each display device 220 can then determine the relative position of the display device 220 according to the first component voltage and the second component voltage of the positioning module 226, and further control the display device 220 to display the divided image according to the video signal and the relative position of the display device 220.

Figure 4:
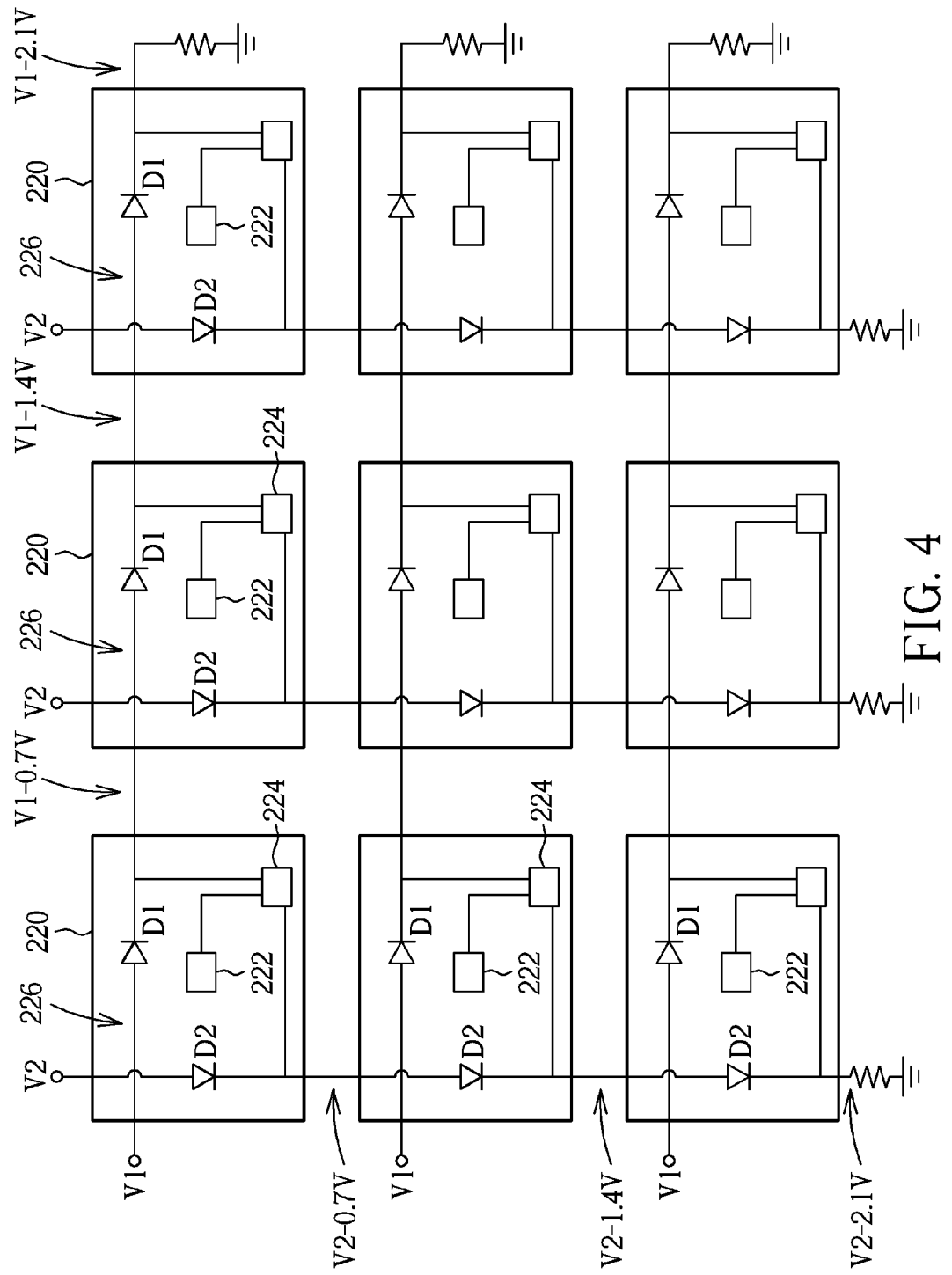
FIG. 4 is a diagram showing a second embodiment of the display devices of the present invention.

Please refer to FIG. 4 and FIG. 2 as well. FIG. 4 is a diagram showing a second embodiment of the display devices 220 of the present invention. As shown in FIG. 4, the positioning module 226 comprises a first diode D1 and a second diode D2. The first diode D1 is coupled to another first diode D1 of the adjacent positioning module in the same row in series for generating a first component voltage according to a first DC voltage source V1. The second diode D2 is coupled to another second diode D2 of the adjacent positioning module in the same column in series for generating a second component voltage according to a second DC voltage source V2. The sensing unit 224 is for sensing the first component voltage and the second component voltage generated by the positioning module 226. Since a voltage difference (around 0.7V) is formed at two ends of the diodes, the series-coupled first diode D1 and second diode D2 respectively generate the corresponding first component voltage and the corresponding second component voltage (that is, the positioning signals) according to the relative positions of the first resistor R1 and second resistor R2. The display control unit 222 of each display device 220 can then determine the relative position of the display device 220 according to the first component voltage and the second component voltage of the positioning module 226, and further control the display device 220 to display the divided image according to the video signal and the relative position of the display device 220.

Figure 5:
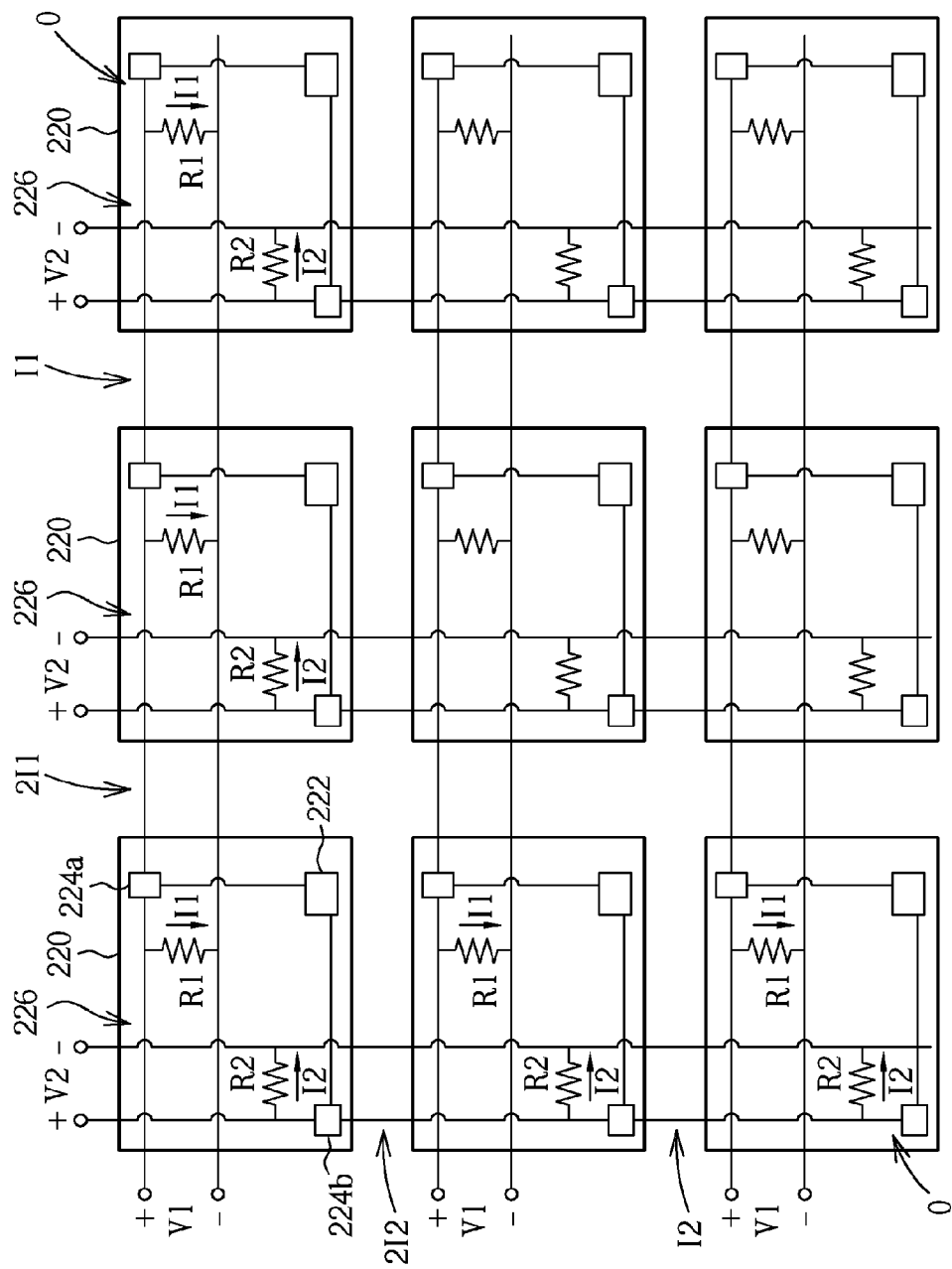
FIG. 5 is a diagram showing a third embodiment of the display devices of the present invention.

Please refer to FIG. 5 and FIG. 2 as well. FIG. 5 is a diagram showing a third embodiment of the display devices 220 of the present invention. As shown in FIG. 5, the module 226 comprises a first resistor R1 and a second resistor R2. A first end of the first resistor R1 is coupled to a first end of a first DC voltage source V1, and a second end of the first resistor R1 is coupled to a second end of the first DC voltage source V1. A first end of the second resistor R2 is coupled to a first end of a second DC voltage source V2, and a second end of the second resistor R2 is coupled to a second end of the second DC voltage source V2. According to the above arrangement, the first resistor R1 and the second resistor R2 will generate a first current I1 and a second current I2 respectively. A first sensing element 224a of the sensing unit is coupled between the first end of the first resistor R1 and a first end of another first resistor R1 of the adjacent positioning module in the same row for sensing a level of the first current I1 flowing through the first sensing element 224a. A second sensing element 224b of the sensing unit is coupled between the first end of the second resistor R2 and a first end of another second resistor R2 of the adjacent positioning module in the same column for sensing a level of the second current I2 flowing through the second sensing element 224b. Since the first sensing element 224a and the second sensing element 224b sense the corresponding current levels (that is, positioning signals) according to relative positions of the first sensing element 224a and the second sensing element 224b, the display control unit 222 of each display device 220 can then determine the relative position of the display device 220 according to the level of the first current flowing through the first sensing element 224a and the level of the second current flowing through the second sensing element 224b, and further control the display device 220 to display the divided image according to the video signal and the relative position of the display device 220.

Figure 6:
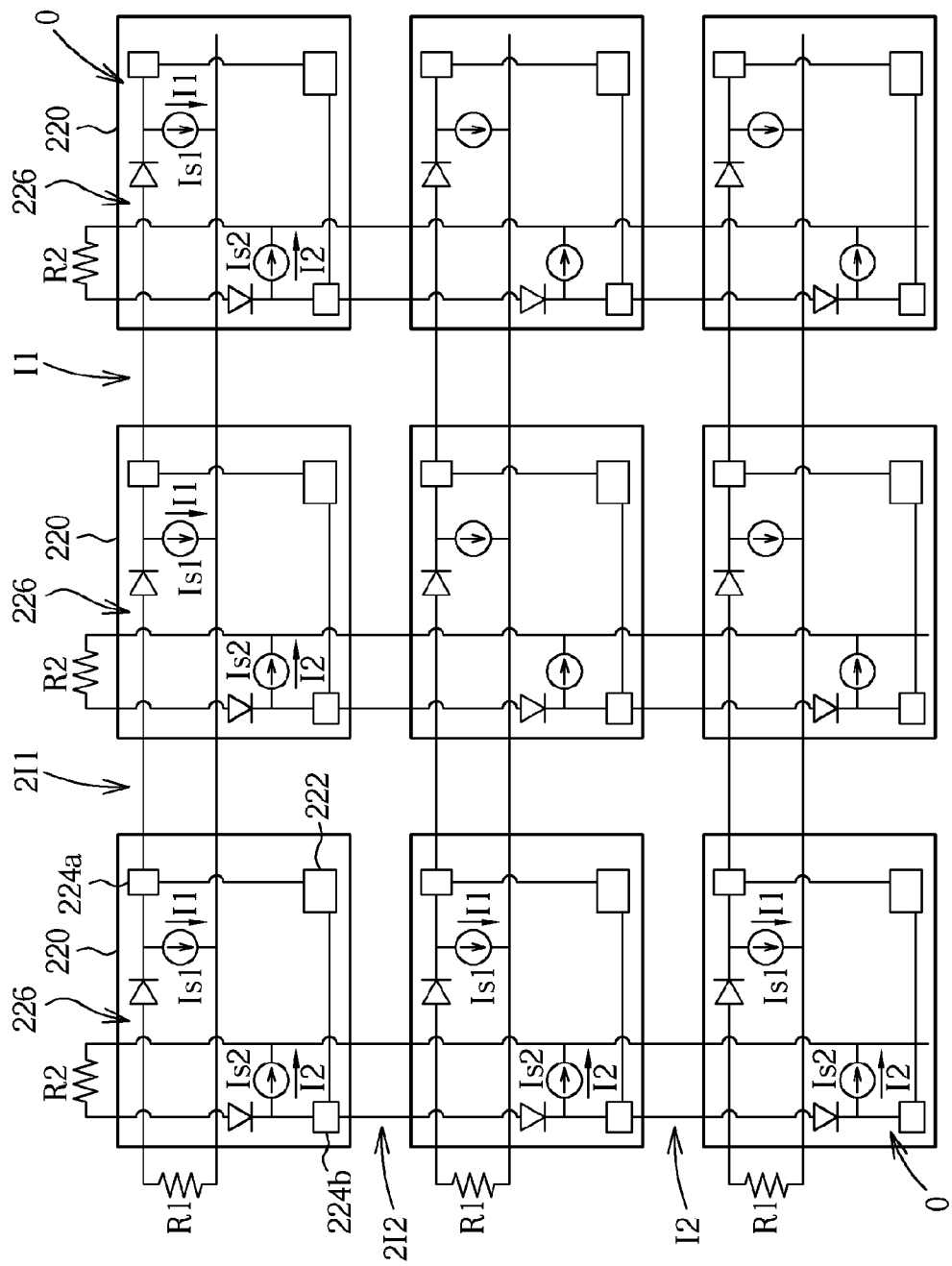
FIG. 6 is a diagram showing a fourth embodiment of the display devices of the present invention.

Please refer to FIG. 6 and FIG. 2 as well. FIG. 6 is a diagram showing a fourth embodiment of the display devices 220 of the present invention. As shown in FIG. 6, the positioning module 226 comprises a first current source Is1 and a second current source Is2. A first end of the first current source Is1 is coupled to a first end of the first resistor R1, and a second end of the first current source Is1 is coupled to a second end of the first resistor R1. A first end of the second current source Is2 is coupled to a first end of the second resistor R2, and a second end of the second current source Is2 is coupled to a second end of the second resistor R2. The first current source Is1 and the second current source Is2 are for generating a first current I1 and a second current I2 respectively. A first sensing element 224a of the sensing unit is coupled between the first end of the first current source Is1 and a first end of another first current source Is1 of the adjacent positioning module in the same row for sensing a level of the first current flowing through the first sensing element 224a. A second sensing element 224b of the sensing unit is coupled between the first end of the second current source Is2 and a first end of another second current source Is2 of the adjacent positioning module in the same column for sensing a level of the second current flowing through the first sensing element 224b. Since the first sensing element 224a and the second sensing element 224b sense the corresponding current levels (that is, the positioning signals) according to the relative positions, the display control unit 222 of each display device 220 can then determine the relative position of the display device 220 according to the level of the first current flowing through the first sensing element 224a and the level of the second current flowing through the second sensing element 224b, and further control the display device 220 to display the divided image according to the video signal and the relative position of the display device 220.

In addition, in the above positioning modules, it is not necessary for the method for generating a horizontal positioning signal to be the same as the method for generating a vertical positioning signal. The horizontal positioning signal and the vertical positioning signal of the positioning module can be generated by different methods. For example, the horizontal positioning signal of the positioning module can be a voltage signal generated by the first diode, and the vertical positioning signal of the positioning module can be a current signal generated by the second current source. Therefore, the horizontal positioning signal and the vertical positioning signal of the positioning module can be generated by any combination of the methods illustrated above. Meanwhile, the present invention is not restricted to the above embodiments. The positioning signal can be any electrical signal generated between the adjacent display devices by coupling identical or different components.

Summarizing the above, the TV wall system 200 of the present invention utilizes the positioning module 226 to generate the positioning signal, such that the display control unit 222 can determine the relative position of the display device 220 according to the positioning signal, and further control the display device 220 to display the divided image according to the video signal and the relative position of the display device 220.

In contrast to the prior art, the TV wall system of the present invention can directly control the display device to display the divided image according to the positioning signal without manually inputting the relative position information. Therefore, setting of the TV wall system of the present invention is easier and not prone to error.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A TV wall system capable of displaying images according to a positioning signal, the TV wall system comprising:
 a video source for providing a video signal; and
 at least one row of display devices coupled to the video source, the at least one row of display devices comprising a plurality of display devices coupled to each other in a cascaded manner, each of the display devices comprising:
  a positioning module for generating a positioning signal, the positioning module comprising a first resistor and a second resistor, a first end of the first resistor being coupled to a first end of a first DC voltage source, a second end of the first resistor being coupled to a second end of the first DC voltage source, a first end of the second resistor being coupled to a first end of a second DC voltage source, a second end of the second resistor being coupled to a second end of the second DC voltage source;

a sensing unit coupled to the positioning module for sensing the positioning signal generated by the positioning module, the sensing unit comprising a first sensing element and a second sensing element, the first sensing element being coupled between the first end of the first resistor and a first end of a first resistor of an adjacent positioning module in a same row for sensing a first current flowing through the first sensing element, the second sensing element being coupled between the first end of the second resistor and a first end of a second resistor of an adjacent positioning module in a same column for sensing a second current flowing through the second sensing element; and a display control unit for controlling the display device to display images according to the video signal and the positioning signal sensed by the sensing unit, the first current flowing through the first sensing element, and the second current flowing through the second sensing element.

2. A TV wall system capable of displaying images according to a positioning signal, the TV wall system comprising:
a video source for providing a video signal; and
at least one row of display devices coupled to the video source, the at least one row of display devices comprising a plurality of display devices coupled to each other in a cascaded manner, each of the display devices comprising:

a positioning module for generating a positioning signal, the positioning module comprising a first current source and a second current source, a first end of the first current source being coupled to a first end of a first resistor, a second end of the first current source being coupled to a second end of the first resistor, a first end of the second current source being coupled to a first end of a second resistor, a second end of the second current source being coupled to a second end of the second resistor;

a sensing unit coupled to the positioning module for sensing the positioning signal generated by the positioning module, the sensing unit comprising a first sensing element and a second sensing element, the first sensing element being coupled between the first end of the first current source and a first end of another first current source of an adjacent positioning module in a same row for sensing a first current flowing through the first sensing element, the second sensing element being coupled between the first end of the second current source and a first end of another second current source of an adjacent positioning module in a same column for sensing a second current flowing through the second sensing element; and a display control unit for controlling the display device to display images according to the video signal, the first current flowing through the first sensing element, and the second current flowing through the second sensing element.

* * * * *